UNITED STATES PATENT OFFICE.

FRANK MONFORTE, OF OTISVILLE, NEW YORK.

WATERPROOFING COMPOSITION.

1,118,791.  Specification of Letters Patent.  Patented Nov. 24, 1914.

No Drawing.  Application filed February 13, 1914.  Serial No. 818,514.

*To all whom it may concern:*

Be it known that I, FRANK MONFORTE, a citizen of the United States, and a resident of Otisville, in the county of Orange and State of New York, have made certain new and useful Improvements in Waterproofing Compositions, of which the following is a specification.

My invention relates to improvements in waterproofing compositions, and it consists in the compound made of the ingredients as hereinafter described.

An object of my invention is to provide a waterproofing composition which will render leather, such as that used for shoes, boots, and the like, waterproof.

A further object of my invention is to provide a composition of matter which will render leather waterproof, while at the same time possessing ingredients which tend to prolong the life of the leather.

Other objects and advantages will appear in the following specification and the novel features of the composition will be set forth in the appended claim.

In carrying out my invention I make use of tallow, oleomargarin, linseed oil, kerosene, resin, and a black coloring matter. The preferred manner of making this compound is as follows: Ten pounds of tallow is boiled until the liquid separates into an oil and a brown residue or precipitate. The oil is then strained from the residue and heated. Two pounds of oleomargarin is then melted with the tallow oil. I then take three pints of linseed oil, one quart of kerosene, one pound of common resin, and one-half pound of a black coloring matter and thoroughly mix these ingredients together with the tallow oil and the oleomargarin. The mixture is best accomplished by stirring the ingredients together for about twenty minutes. The composition thus formed is then allowed to cool for at least an hour when it is ready for use.

I claim:—

The herein described waterproofing composition, which consists of the following ingredients in the proportions specified, ten pounds of tallow, two pounds of oleomargarin, three pints of linseed oil, one quart of kerosene, one pound of resin, and one-half pound of coloring matter.

FRANK MONFORTE.

Witnesses:
B. HELTERLINE,
FRANK P. COX.

Copies of this patent may be obtained for five cents each, by addressing the "Commissioner of Patents, Washington, D. C."